(12) United States Patent
Riedl

(10) Patent No.: US 9,790,067 B2
(45) Date of Patent: Oct. 17, 2017

(54) HEIGHT-ADJUSTABLE SUPPORT DEVICE FOR SEMI-TRAILERS OR THE LIKE

(71) Applicant: SAF-HOLLAND GmbH, Bessenbach (DE)

(72) Inventor: Reinhold Riedl, Miltenberg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 2 days.

(21) Appl. No.: 14/378,985

(22) PCT Filed: Mar. 19, 2013

(86) PCT No.: PCT/EP2013/055605
§ 371 (c)(1),
(2) Date: Aug. 15, 2014

(87) PCT Pub. No.: WO2013/143907
PCT Pub. Date: Oct. 3, 2013

(65) Prior Publication Data
US 2015/0014608 A1    Jan. 15, 2015

(30) Foreign Application Priority Data

Mar. 29, 2012  (DE) .................... 10 2012 205 039

(51) Int. Cl.
*B66F 7/06* (2006.01)
*B60S 9/08* (2006.01)
(Continued)

(52) U.S. Cl.
CPC ............. *B66F 7/0608* (2013.01); *B60S 9/06* (2013.01); *B60S 9/08* (2013.01); *B60S 9/16* (2013.01);
(Continued)

(58) Field of Classification Search
CPC ...... B66F 3/08; B66F 3/02; B66F 3/44; B66F 3/18; B60S 9/04; B60S 9/08; B60S 9/16; B60S 9/06
See application file for complete search history.

(56) References Cited

U.S. PATENT DOCUMENTS 2,565,401 A * 8/1951 Smith ................. B66F 3/16
254/103
2,663,542 A * 12/1953 Lincoln ............. B66F 3/08
254/100
(Continued)

FOREIGN PATENT DOCUMENTS

CN       1970356      5/2007
CN       101837770    9/2010
(Continued)

OTHER PUBLICATIONS

European Search Report, European PTO, dated Jul. 16, 2013.

*Primary Examiner* — Monica Carter
*Assistant Examiner* — Seahee Yoon
(74) *Attorney, Agent, or Firm* — Price Heneveld LLP

(57) ABSTRACT

A support device, preferably for commercial vehicles such as semi-trailers, includes an inner support tube and an outer support tube moveable relative to one another along a longitudinal axis in a retraction and extension direction; a spindle rotated via a gear section and is arranged such that the spindle is stationary relative to the outer support tube; and a spindle nut which is mounted on the spindle, wherein the spindle nut is fixed on a mounting region of the inner support tube, and the mounting region is configured as a support edge facing the longitudinal axis.

22 Claims, 2 Drawing Sheets

(51) Int. Cl.
   *B60S 9/16* (2006.01)
   *B60S 9/06* (2006.01)
   *B66D 1/66* (2006.01)
   *B66F 3/08* (2006.01)

(52) U.S. Cl.
   CPC .................. *B66D 1/66* (2013.01); *B66F 3/08* (2013.01); *Y10T 29/49826* (2015.01)

(56) References Cited

U.S. PATENT DOCUMENTS

| | | | |
|---|---|---|---|
| 3,257,098 A | | 6/1966 | Hotchkin |
| 3,259,364 A | * | 7/1966 | Hulverson ............... B60D 1/66 254/419 |
| 3,595,527 A | * | 7/1971 | Douglass ................. B60S 9/06 254/420 |
| 4,796,864 A | * | 1/1989 | Wilson ..................... B60S 9/08 254/103 |
| 5,199,738 A | * | 4/1993 | VanDenberg ............ B60S 9/08 192/69.91 |
| 5,848,554 A | | 12/1998 | Kober et al. |
| 6,099,016 A | * | 8/2000 | Peveler ..................... B60S 9/08 254/419 |
| 6,846,016 B2 | * | 1/2005 | VanDenberg ............. B60S 9/08 248/188.2 |
| 7,152,848 B2 | * | 12/2006 | Pfleging, Jr. .............. B60S 9/08 254/419 |
| 8,408,522 B2 | * | 4/2013 | Birkholz ................... B60S 9/08 254/418 |
| 2008/0197332 A1 | * | 8/2008 | Siedel ....................... B60S 9/08 254/424 |
| 2012/0126520 A1 | * | 5/2012 | Righetti ................... B60S 9/08 280/766.1 |

FOREIGN PATENT DOCUMENTS

| | | |
|---|---|---|
| DE | 2648506 | 4/1977 |
| DE | 19616704 | 10/1997 |
| DE | 19836635 | 2/2000 |
| DE | 10149926 | 4/2003 |
| DE | 102005034554 | 2/2007 |
| DE | 102006035917 | 11/2007 |
| EP | 1747956 | 1/2007 |
| JP | H10147217 | 6/1998 |
| WO | 2011015567 | 2/2011 |

* cited by examiner

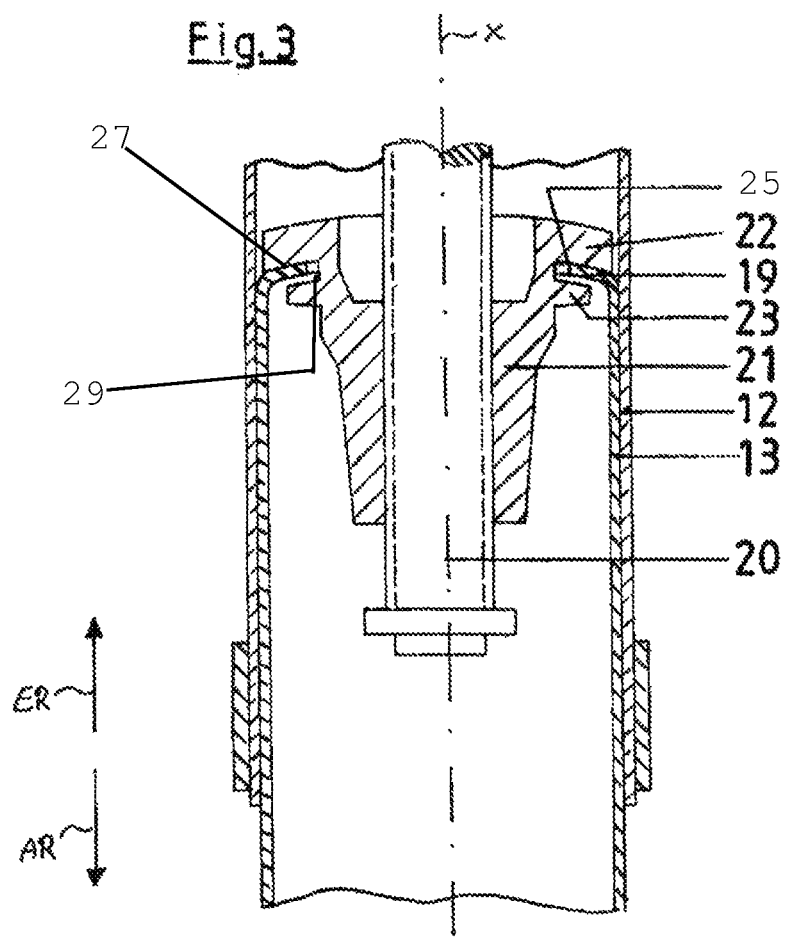
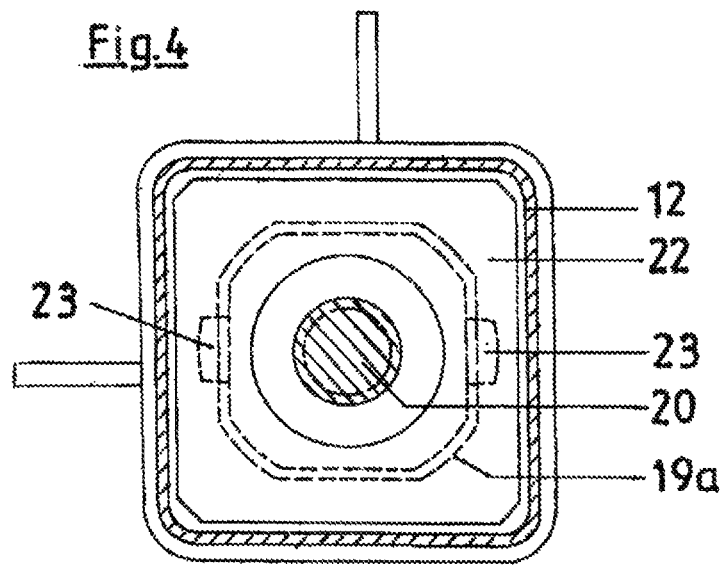

HEIGHT-ADJUSTABLE SUPPORT DEVICE FOR SEMI-TRAILERS OR THE LIKE

BACKGROUND OF THE INVENTION

The invention relates to a support device for semi-trailers or the like, which is in particular height-adjustable. Such support devices are preferably arranged in pairs at the front of semi-trailers and expediently may be extended or retracted, i.e. adjusted between the support and the transport positions, and, in addition, they may be used for lifting the front area of the semi-trailer, insofar as this is required during hitching.

Support devices of the type in question are known from DE 196 16 704 A1 and DE 198 36 635 C5, for example. Here, in each case, a spindle nut of a lifting spindle drive is rigidly fastened to an extendible inner tube. In case there is a force or thrust on parked semi-trailers due to an air leak of the axle suspensions in the longitudinal direction of the vehicle or during loading or unloading in the lateral direction of the vehicle, for example, the support devices have to absorb also transverse forces in addition to the vertical load. This leads in particular to a bending load on the extended inner support tubes, the upper portions of which are located with guide clearance in the outer support tubes attached to the vehicle chassis. Here, there is the danger that the inner and outer tubes cant, which leads to bending so that, in the case of a rigid connection of the spindle nut and the inner support tube, the spindle may be bent, making the crank drive, which is usually provided, difficult to move, or making the support inoperative. U.S. Pat. No. 6,099,016 disclosed a support for a semi-trailer, where the spindle nut and the inner support tube are arranged mobile relative to one another and the spindle nut has a greater lateral movement clearance than the inner support tube so that it is prevented that the spindle bends. In this support, the supporting force will be absorbed by means of a plate attached below the spindle nut in the inner support tube.

Thus, the object underlying the present invention is to provide a support device, preferably for commercial vehicles such as semi-trailers, where the bending load on the spindle, in use, is reduced or prevented and which requires both less material and manufacturing outlay and which allows for simple mounting and dismounting.

SUMMARY OF THE INVENTION

According to the invention, there is provided a support device, preferably for commercial vehicles or utility vehicles such as semi-trailers, comprising an inner support tube and an outer support tube, which can be displaced or moved relative to one another along a longitudinal axis in a retraction and extension direction, a spindle, which can be rotated via a gear section and is arranged such that it is stationary relative to the outer support tube, a spindle nut, which is mounted on the spindle, wherein the spindle nut is fixed on a mounting region of the inner support tube, said mounting region being formed as a support edge facing the longitudinal axis. The support device according to the invention serves in particular for supporting a semi-trailer and, to this end, expediently, is fixed in pairs at a front portion of the semi-trailer or the frame thereof. In order to make it possible to adjust the support device between a supporting position and a transport position, the inner support tube and the outer support tube are movable or slidable or retractable or extendible relative to one another along a longitudinal axis. Here, the inner support tube may be telescopically inserted into the outer support tube. Generally, the outer support tube is firmly connected to the vehicle frame. The inner support tube arranged displaceably therein has a foot or a supporting foot at the end opposite of the fastening point or at the free end of the inner support tube. In order to make it possible to displace the inner support tube relative to the outer support tube, there is provided a spindle, which preferably is provided coaxially or concentrically to the longitudinal axis of the support device. The spindle can be driven by means of a gear section, by implicating a torque into a gear arrangement by means of a hand crank or a motor-driven drive mechanism, which gear arrangement passes the torque on to the spindle, preferably via a bevel gear arrangement, and thus turns the spindle. When seen in the retraction or extension direction, the spindle advantageously is arranged stationarily relative to the outer support tube. To put it differently, the spindle is advantageously fixed rotatably in the outer support tube. In order to transform the rotation of the spindle into a displacement of the inner support tube, there is provided a spindle nut, which is supported on the spindle. In particular in a circumferential area of the spindle nut, the latter is fixed to a fastening area of the inner support tube such that the spindle nut is secured against turning or rotation about the longitudinal axis. According to the invention, the fastening area of the inner support tube, by means of which the spindle nut is fixed to the same, is formed as a support edge facing the longitudinal axis of the support device or of the inner tube or of the outer tube. To put it differently, the support edge may face towards the inside, i.e. the edge contour of the support edge faces the longitudinal axis or axis of symmetry of the support device. Particularly advantageously, the support edge is formed transverse, expediently perpendicular, to the longitudinal axis. As a matter of course, the support edge may also be inclined at an angle relative to the longitudinal axis, for example an angle between 60° and 89°, preferably between 70° and 88°, and particularly preferably between 75° and 85°.

Preferably, the support edge has a support edge sided support surface, which is curved or arched. The support edge sided support surface is that surface of the support edge, which, in the support device, faces upwards or away from the supporting foot or towards the gear section. The support edge sided support surface offers a bearing for the spindle nut so that the forces (or vertical forces) introduced from the vehicle into the outer support tube may be transmitted via the spindle into the spindle nut and from there via the support edge sided support surface into the inner support tube. The support edge sided support surface is particularly advantageously curved and particularly expediently curved in a round manner such that the curvature faces the gear section. Preferably, the support edge sided support surface, therefore, is formed curved towards the gear section, wherein at least over a certain area a spherical curvature is preferred. Thus, it is possible to stabilize the upper end of the inner support tube so that the behavior thereof is optimized when there is a bending load.

Expediently, the spindle nut has a support flange for transmitting the load on the inner support tube. The force acting on the spindle nut is therefore transmitted to the support edge of the inner support tube via the area formed as support flange. Expediently, the support flange is arranged above the support edge sided support surface, i.e. towards the gear section.

Preferably, the support edge—when seen in the retraction or extension direction—is arranged between the support edge flange and at least one interlocking section of the spindle nut, which radially extends away from the longitudinal axis. Particularly advantageously, there are provided two radially protruding interlocking sections, which are arranged opposite one another. It is also possible to provide another plurality of radially protruding interlocking sections. The distances between the interlocking sections and the support flange in the retraction and extension direction are larger than the thickness of the support edge, so that advantageously it may be easily fixed therein. Further expediently, the support flange extends in the radial direction further outwards than the respective reinforcement or interlocking section.

Advantageously, the support flange has a flange-sided support surface, which at least over a certain area is congruent in shape to a support edge sided support surface. The flange-sided support surface forming the bottom side of the support flange, thus, is that surface, which contacts or comes into engagement with the support edge sided support surface or by means of which the force is transmitted to the inner support tube. In order to ensure an optimum force transmission, the support edge sided support surface and the flange-sided support surface are formed congruent in shape at least over a certain area, which means that they have a curved surface geometry and essentially the same angle of curvature.

Preferably, the inner support tube, in particular in the area of the support edge thereof, and the spindle nut are displaceable relative to each other and transverse to the longitudinal axis. To put it differently, it is possible to move the inner support tube in the area of the support edge thereof transverse to the axis of rotation of the spindle nut in order to reduce a possible bending load on the spindle. To this end, there is provided a radial distance between the support edge contour and the spindle nut.

Further preferably, the outer support tube and the spindle nut are displaceable relative to each other and transverse to the longitudinal axis. Thus, preferably, there is provided a radial free space between the spindle nut and the outer support tube.

In a particularly preferred embodiment, the clearance between the inner support tube and the outer support tube is smaller than a maximum path of displacement transverse to the longitudinal axis between the spindle nut and the inner support tube and/or between the spindle nut and the outer support tube. The clearance between the inner support tube and the outer support tube is after all the gap between said two elements. Advantageously, said gap is smaller than a maximum path of displacement transverse to the longitudinal axis between the spindle nut and the inner support tube. To put it differently, said gap is smaller than a radial distance or free space between the support edge contour and the spindle nut. Accordingly, the clearance between the inner support tube and the outer support tube is also smaller than the radial free space between the spindle nut and the outer support tube.

In an advantageous embodiment, the support edge forms an integral part of the inner support tube. The support edge may thus be accordingly shaped from the upper wall portions of the inner support tube In an alternative embodiment, the support edge may be formed multi-part with the inner support tube. Here, the support edge may be a separate element placed upon the inner support tube, which element preferably is fixed with the inner support tube.

In a preferred embodiment, the support edge has an opening forming a support edge contour, which is suitable for at least partially accommodating the spindle, wherein the radial distance between the support edge contour and the longitudinal axis is not constant. Thus, the support edge contour is the opening or mouth of the support edge and, thus, forms an edge extending over the entire circumference of the longitudinal axis, into which the spindle may immerse. The support edge contour may have a circular cross-section in a plane seen perpendicular relative to the longitudinal axis. It is however preferred that the support edge contour has a cross-section, which is not constant, i.e. the distance of which from the longitudinal axis is different in different areas. A preferred geometric shape is an irregular octagon having two or three opposite lateral surface pairs of different lengths.

Further according to the invention, the support device can be or is manufactured as follows:

providing an inner support tube and an outer support tube, which can be displaced relative to one another along a longitudinal axis in a retraction or extension direction, wherein the inner support tube has a mounting region being formed as a support edge facing the longitudinal axis for fixing the spindle nut, providing a spindle and a spindle nut, which is supported on the spindle, wherein the spindle nut comprises at least one interlocking section, the interlocking section extending transversely or radially away from the longitudinal axis, orienting the spindle nut relative to the inner support tube such that the interlocking section is arranged in the radial direction to the longitudinal axis furthest away from the support edge contour of the support edge, arranging the spindle nut in the inner support tube such that when the spindle nut rotates towards the inner support tube, the interlocking section comes into engagement with the support edge, in particular is arranged below the support edge or is in alignment with the support edge in the direction of the longitudinal axis.

BRIEF DESCRIPTION OF THE DRAWINGS

Further advantages and features of the invention become apparent from the following description of a preferred embodiment with reference to the appended Figures. The Figures show:

FIG. 3 shows a longitudinal section along the line A-A of the support device shown in FIG. 2, FIG. 4 shows a cross-section along the line B-B of the support device shown in FIG. 1.

DETAILED DESCRIPTION OF THE PREFERRED EMBODIMENTS

Figure 1:
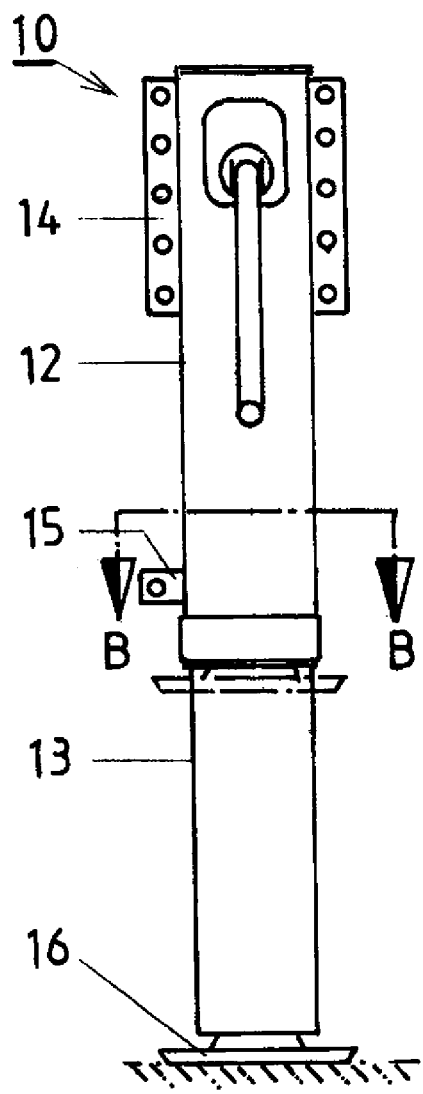
FIG. 1 shows a front view of a preferred embodiment of the support device according to the invention.
Figure 2:
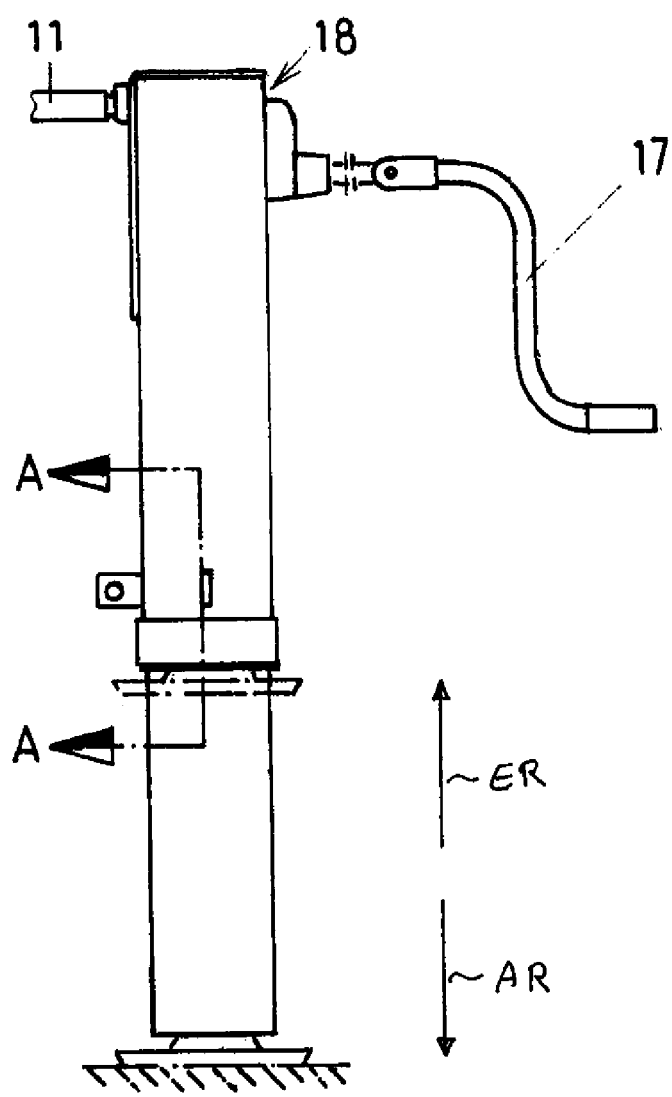
FIG. 2 shows a side view of the support device shown in FIG. 1.

The support or support device 10 shown in FIGS. 1 to 4 is used in pairs on a semi-trailer, wherein the support devices 10 are drivingly connected by means of a connecting shaft 11. In the transport position, the supports are retracted, i.e. in their shortened state. Before it is possible to decouple the semi-trailer from the semi-trailer truck, the support devices 10 have to be extended in order to support the semi-trailer. The support device 10 has an outer support tube 12 and an inner support tube 13, which is arranged therein in such a manner that it is longitudinally movable in the retraction direction ER and in the extension direction AR. The outer support tube 12 and the inner support tube 13 expediently have square cross-sections. The support device 10 is fixed to and braced with the chassis of the semi-trailer by means of a screw-on plate 14 and brace lugs 15 arranged on the outer support tube 12. At the lower end of the inner support tube 13, there is provided a foot 16 for touching down onto the ground. The support is driven by means of a hand crank 17 via a gear section 18.

As is shown in FIG. 3, the inner support tube 13 at its upper portion has an inwards facing support edge 19. The support edge 19 includes an opening 25, and a support edge sided support surface 27 with an inner support edge contour 19a that corresponds in its shape to the partial portion of a convex, preferably spherical, curvature facing or curved towards the gear section 19. The inner support edge contour 19a of the support edge 19 is designed such that it runs at different distances from the axis of symmetry or the longitudinal axis x of the inner support tube 13. Downstream of the gear section 18 there is provided a spindle 20, which is in engagement with a spindle nut 21. The spindle nut 21 has a support flange 22, which in the loading case of the support 10 shown rests on the support edge 19 of the inner support tube 13, to which end it is formed congruent to the support edge sided support surface of the support edge 19 on the bottom side or flange-sided support surface 29.

On the spindle nut 21, below the support flange 22 thereof and at a distance slightly more than the wall thickness of the support edge 19 away from the support flange 22, in opposite arrangement, there are two radially protruding interlocking sections 23. The spindle nut 21 with screwed-in spindle 20 is mounted in a simple manner. To this end, the spindle nut 21 is inserted into the inner support tube 13 in a position, where the interlocking sections 23 thereof are located in those areas of the support edge contour 19a, which are furthest away from the axis of symmetry or longitudinal axis x of the inner support tube 13, and are rotated by 45°. Here, the interlocking sections 23 swivel or pivot below the support edge 19. In the unloaded state of the support 10, the support edge 19 rests on the interlocking sections 23, and the inner support tube 13 and the foot 16 are carried or supported by the interlocking sections 23 so that said parts may not sink down or be lost in the transport position.

The spindle nut 21 and the spindle 20 are dismounted in reverse order as they have been mounted, which has been described above. Therefore, a defective spindle nut 21 or spindle 20 may be easily replaced.

LIST OF REFERENCE SIGNS 10 support
11 connecting shaft
12 outer support tube
13 inner support tube
14 screw-on plate
15 brace lug
16 foot
17 hand crank
18 gear section
19 support edge
19a support edge contour
20 spindle
21 spindle nut
22 support flange
23 interlocking section
x longitudinal axis
ER retraction direction
AR extension direction

The invention claimed is:

1. A support device for commercial vehicles comprising:
an inner support tube and an outer support tube moveable relative to one another along a longitudinal axis in a retraction direction and an extension direction;
a spindle rotated via a gear section and arranged such that the spindle is stationary relative to the outer support tube; and
a spindle nut mounted on the spindle, wherein the spindle nut is fixed on a mounting region of the inner support tube, the mounting region is configured as a support edge facing the longitudinal axis, the support edge includes a support edge sided support surface, the support edge sided support surface includes a convex curve facing the gear section, the inner support tube and the spindle nut are displaceable relative to one another transverse to the longitudinal axis as the inner support tube and the outer support tube move relative to one another in the retraction and extension directions, and wherein a clearance between the inner support tube and the outer support tube is smaller than a maximum path of displacement transverse to the longitudinal axis between the spindle nut and one of the inner support tube and the outer support tube.

2. The support device of claim 1, wherein the curvature of the support edge sided support surface faces the gear section, and wherein at least a certain area of the curvature comprises a spherical arch.

3. The support device of claim 2, wherein the spindle nut includes a support flange for transmitting a load to the inner support tube, the support flange arranged above the support edge sided support surface.

4. The support device of claim 3, wherein the support edge is arranged between the support flange and at least one interlocking section of the spindle nut, the interlocking section extending transversely from the longitudinal axis.

5. The support device of claim 3, wherein the support flange includes a flange-sided support surface, and wherein at least a certain area of the flange-sided support surface is congruent in shape to the support edge sided support surface.

6. The support device of claim 5, wherein the outer support tube and the spindle nut are displaceable relative to each other transverse to the longitudinal axis.

7. The support device of claim 6, wherein the support edge comprises an integral part of the inner support tube, and wherein the support edge comprises upper wall portions of the inner support tube.

8. The support device of claim 6, wherein the support edge is a separate element from the inner support tube.

9. The support device of claim 7, wherein the support edge comprises an opening forming a support edge contour, the opening being configured to at least partially accommodate the spindle, and wherein a radial distance between the support edge contour and the longitudinal axis is not constant.

10. The support device of claim 9, wherein the support edge is at least partially inclined in relation to the longitudinal axis at an inclination of between 60° and 89°.

11. The support device of claim 10, wherein the support edge is at least partially inclined in relation to the longitudinal axis at an angle of between 70° and 88°.

12. The support device of claim 1, wherein the spindle nut includes a support flange for transmitting a load to the inner support tube, the support flange arranged above the support edge sided support surface.

13. The support device of claim 1, wherein the support edge is arranged between a support flange and at least one interlocking section of the spindle nut, the at least one interlocking section extending transversely from the longitudinal axis.

14. The support device of claim 12, wherein the support flange includes a flange-sided support surface, and wherein at least a certain area of the flange-sided support surface is congruent in shape to the support edge sided support surface.

15. The support device of claim 1, wherein the outer support tube and the spindle nut are displaceable relative to each other transverse to the longitudinal axis.

16. The support device of claim 1, wherein a clearance between the inner support tube and the outer support tube is smaller than a maximum path of displacement transverse to the longitudinal axis between the spindle nut and one of the inner support tube and the outer support tube.

17. The support device of claim 1, wherein the support edge comprises an integral part of the inner support tube, and wherein the support edge comprises upper wall portions of the inner support tube.

18. The support device of claim 1, wherein the support edge is a separate element from the inner support tube.

19. The support device of claim 1, wherein the spindle extends at least partially through the support edge, and wherein a radial distance between a support edge contour and the longitudinal axis is not constant.

20. The support device of claim 1, wherein the support edge is at least partially inclined in relation to the longitudinal axis at an inclination of between 60° and 89°.

21. The support device of claim 20, wherein the support edge is at least partially inclined in relation to the longitudinal axis at an angle of between 70° and 88°.

22. A method for manufacturing a support device for commercial vehicles, the method comprising the steps of:

providing an inner support tube and an outer support tube moveable relative to one another along a longitudinal axis in a retraction direction and an extension direction, wherein the inner support tube includes a mounting region configured as a support edge facing the longitudinal axis for fixing a spindle nut;

providing a spindle that supports the spindle nut, wherein the spindle nut comprises at least one interlocking section, the interlocking section extending transversely from the longitudinal axis, and wherein the spindle may be rotated via a gear section;

orienting the spindle nut relative to the inner support tube such that the interlocking section is arranged in the radial direction to the longitudinal axis furthest away from a support edge contour of the support edge; and arranging the spindle nut in the inner support tube such that when the spindle nut rotates towards the inner support tube, the interlocking section comes into engagement with the support edge and is arranged at least one of below the support edge, and in alignment with the support edge in the direction of the longitudinal axis, and such that the inner support tube and the spindle nut are displaceable relative to one another transverse to the longitudinal axis as the inner support tube and the outer support tube move relative to one another in the retraction and extension directions, wherein the support edge includes a support edge sided support surface that includes a convex curve facing the gear section, and wherein a clearance between the inner support tube and the outer support tube is smaller than a maximum path of displacement transverse to the longitudinal axis between the spindle nut and one of the inner support tube and the outer support tube.

* * * * *